US008644602B2

(12) United States Patent
Chen et al.

(10) Patent No.: US 8,644,602 B2
(45) Date of Patent: Feb. 4, 2014

(54) COLOUR CORRECTING FOREGROUND COLOURS FOR VISUAL QUALITY IMPROVEMENT

(75) Inventors: Yu-Ling Chen, Epping (AU); Trevor Lee McDonell, Ingleburn (AU)

(73) Assignee: Canon Kabushiki Kaisha, Tokyo (JP)

( * ) Notice: Subject to any disclaimer, the term of this patent is extended or adjusted under 35 U.S.C. 154(b) by 859 days.

(21) Appl. No.: 12/726,665

(22) Filed: Mar. 18, 2010

(65) Prior Publication Data
US 2010/0246951 A1 Sep. 30, 2010

(30) Foreign Application Priority Data

Mar. 31, 2009 (AU) ................................ 2009201252

(51) Int. Cl.
*G06K 9/00* (2006.01)
(52) U.S. Cl.
USPC ........... 382/162; 382/164; 382/167; 358/515; 358/516
(58) Field of Classification Search
USPC ................. 382/164, 162, 170–180, 254, 167; 358/515–525, 1.115–1.16
See application file for complete search history.

(56) References Cited

U.S. PATENT DOCUMENTS

| | | | | |
|---|---|---|---|---|
| 5,680,478 A | * | 10/1997 | Wang et al. | 382/176 |
| 5,892,843 A | * | 4/1999 | Zhou et al. | 382/176 |
| 6,266,156 B1 | * | 7/2001 | Tanimura et al. | 358/1.9 |
| 6,266,439 B1 | * | 7/2001 | Pollard et al. | 382/164 |
| 6,360,006 B1 | * | 3/2002 | Wang | 382/162 |
| 6,917,444 B1 | | 7/2005 | Moriwaki | |
| 7,133,565 B2 | | 11/2006 | Toda et al. | |
| 7,991,224 B2 | * | 8/2011 | Andrew et al. | 382/164 |
| 8,306,325 B2 | * | 11/2012 | Chang | 382/176 |
| 2005/0271275 A1 | * | 12/2005 | Chang | 382/176 |
| 2006/0001690 A1 | | 1/2006 | Martinez et al. | |
| 2008/0123945 A1 | * | 5/2008 | Andrew et al. | 382/164 |
| 2009/0148039 A1 | | 6/2009 | Chen et al. | |
| 2009/0324065 A1 | * | 12/2009 | Ishida et al. | 382/164 |

FOREIGN PATENT DOCUMENTS

WO WO200666325 A2 * 6/2006 ............... G06T 7/00

OTHER PUBLICATIONS

U.S. Appl. No. 12/637,446, filed Dec. 14, 2009. Applicants: Yu-Ling Chen, et al.

* cited by examiner

*Primary Examiner* — Mekonen Bekele
(74) *Attorney, Agent, or Firm* — Fitzpatrick, Cella, Harper & Scinto

(57) ABSTRACT

A method (199) is disclosed for modifying colors of text extracted from an image of a document page to improve visual quality. The document image comprises text and image regions of various colors. The method divides (100) the document image into a plurality of connected components, the connected components comprising pixels of similar color that are closely spatially located, and selects from the image a plurality of the connected components that represent text. The plurality of text connected components are grouped to form a logical structure grouping of said page comprising one or more text blocks wherein each said text block represents a text line or paragraph. One or more logically consistent color sets are then formed (120, 699, 399, 499) for each text block based on the colors of the connected components in the text block. The logically consistent color sets represent all text of visually similar color of the corresponding text line or paragraph. The method then applies color enhancement (130) to the logically consistent color sets to enhance visual quality and correct image defects in the document image.

15 Claims, 13 Drawing Sheets

COLOUR CORRECTING FOREGROUND COLOURS FOR VISUAL QUALITY IMPROVEMENT

REFERENCE TO RELATED PATENT APPLICATION(S)

This application claims the benefit under 35 U.S.C. §119 of the filing date of Australian Patent Application No. 2009201252, filed Mar. 31, 2009, hereby incorporated by reference in its entirety as if fully set forth herein.

TECHNICAL FIELD

The present invention relates to the field of document scanning for storage and other processing and, in particular, to improving the visual quality of the scanned document.

BACKGROUND

The proliferation of imaging technology, combined with ever increasing computational processing power, has led to many advances in the area of document analysis. Document analysis systems may be used to extract semantic information from a scanned document, and the technology is being used in a growing number of applications.

One such application of this technology is to the problem of efficiently storing the information generated from scanned documents in a low memory footprint while maintaining visual quality. A popular format for digitised documents is the Portable Document Format (PDF). Scanned documents are often represented in this format using a combination of a high resolution foreground image, and a background image at a lower resolution and/or higher compression ratio.

Document image analysis for compression involves identifying and separating the scanned image components into these foreground and background layers and compressing the layers separately. The foreground layer may consist of flat filled objects which are stored in memory encoded as bit masks, with the content of each mask represented by a single colour. These flat filled objects are typically the information bearing objects on the page, such as text, tables, and line drawings. This ensures, for example, that text characters remain crisp and legible. The background layer may then have the foreground component removed using inpainting for compression efficiency. Typically the average colour of the pixels surrounding the foreground mask is used for inpainting, and the background is then saved in a compressed image format, such as JPEG.

A problem facing the technique described above is the accurate reproduction of document colours, as the foreground mask colour and inpainted background colour are often polluted by artefacts such as noise and colour bleeding. Such colour pollution may have been caused by printer anti-aliasing, scanner aliasing, chromatic aberrations, and other blurring, haloing or fringing effects.

A basic approach to determining the colour to assign the foreground object is to use the average colour value of the pixels which form the object, for example a text character. This method may be extended to use the average value of other nearby similarly coloured objects, such as all characters in a line of text. This method tries to average out colour pollution errors over a number of pixels, optimistically assuming that such artefacts are, on average, insignificant.

A known extension to the averaging process is to "snap" colours to basic values: colours that are very close to black will be set to pure black, and those close to white set to pure white. A further extension to this is to snap the value of individual colour components, for example CMYK, increasing the component value to maximum saturation if above a certain threshold level, while possibly reducing others.

A further approach to improving the colour of scanned documents is to apply known colour enhancement image processing algorithms to the input scanned page, such as increasing the colour saturation of all pixels by a specified amount. Another such approach is to stretch the dynamic range of the input scan colours, so that the lightest pixel becomes pure white, the darkest pixel is set to pure black, and all other values are stretched proportionally between these two extremes.

Such techniques applied indiscriminately across the page ignore the individual characteristics of the page elements and may reduce colour variations in dark or bright areas. Though the colours of information bearing objects may be enhanced, the image quality in photographic regions may decrease due to a reduction in colour variation. From a users' subjective interpretation of a document image, the information bearing objects dominate the overall visual quality of a page. It is more desirable that the colour enhancement techniques only be applied to the information bearing objects for a document image.

There is a need to accurately reproduce the colours of the information bearing objects on a document image and it is also preferable to enhance these colours to improve the subjective visual quality.

SUMMARY

In accordance with one aspect of the present disclosure, there is provided a method is disclosed for modifying colours of text extracted from an image of a document page to improve visual quality. The document image comprises text and image regions of various colours. The method divides the document image into a plurality of connected components, the connected components comprising pixels of similar colour that are closely spatially located, and selects from the image a plurality of the connected components that represent text. The plurality of text connected components are grouped to form a logical structure grouping of said page comprising one or more text blocks wherein each said text block represents a text line or paragraph. One or more logically consistent colour sets are then formed for each text block based on the colours of the connected components in the text block. The logically consistent colour sets represent all text of visually similar colour of the corresponding text line or paragraph. The method then applies colour enhancement to the logically consistent colour sets to enhance visual quality and correct image defects in the document image.

According to another aspect of the present disclosure there is provided a method of modifying colours of text extracted from a document image of a page. The method generates a first text connected component and a second text connected component from the document image, the first and second text connected components being a different colour and each having a different enclosing background colour. This method determines an output colour based on the colours of the first and second text connected components, the determined output colour being based on a comparison between a colour of at least one text connected component and a threshold. The threshold or colour of the at least one text connected component is adjusted according to the colour of the enclosing background. The colour for the first and second text connected components is then set according to the determined output colour.

Other aspects are also disclosed.

BRIEF DESCRIPTION OF THE DRAWINGS

At least one embodiment of the present invention will now be described with reference to the drawings, in which.

DETAILED DESCRIPTION INCLUDING BEST MODE

Figure 12:
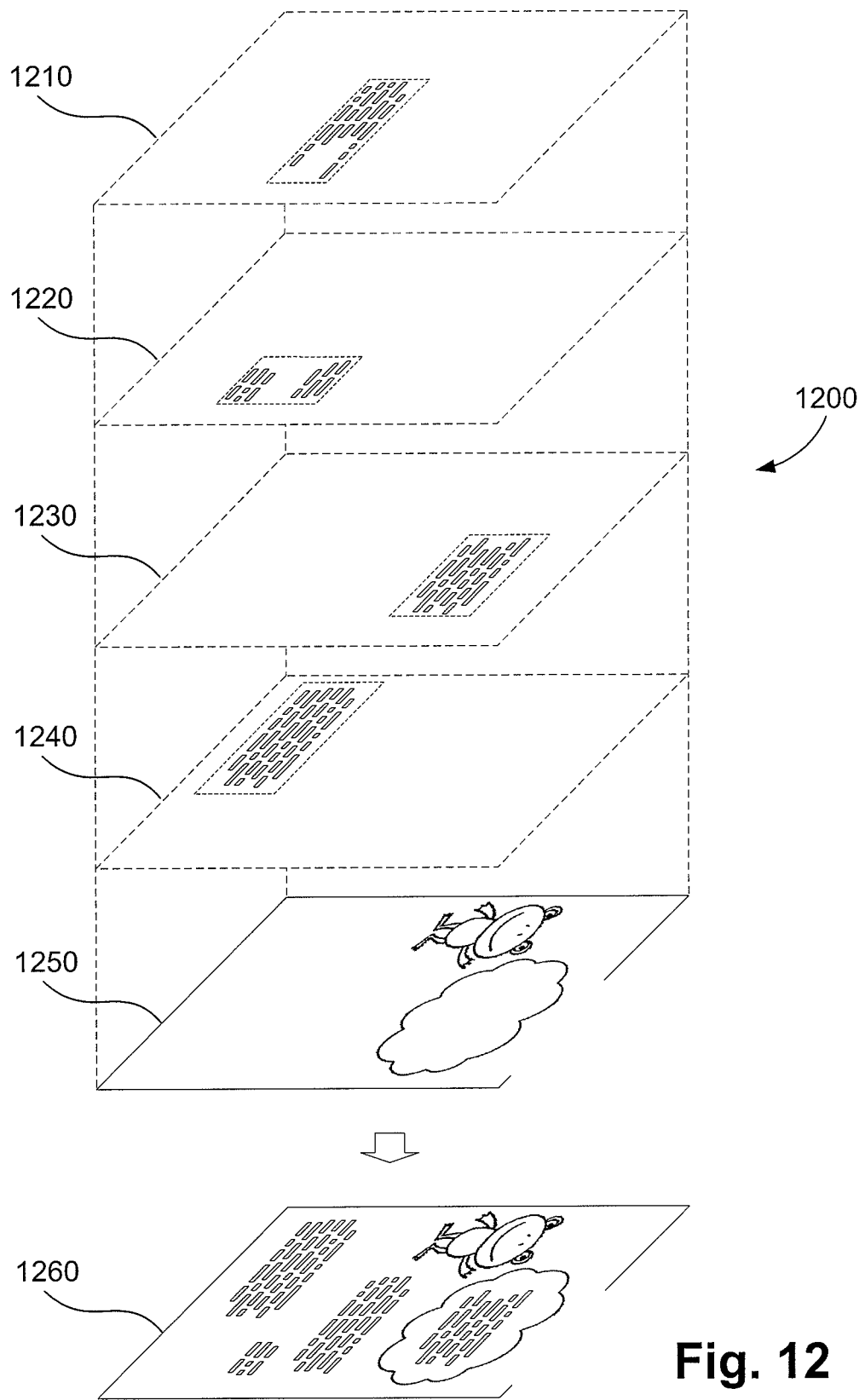
FIG. 12 illustrates an example of decomposing an image using multiple binary foreground layers and the resulting document image.

An example of an output compression scheme 1200 useful in the described arrangements, is shown in FIG. 12, where a document image 1260 has been decomposed into a background layer 1250 containing continuous tone regions, such as photographs, and a plurality of binary foreground layers 1210-1240. Each of the foreground layers defines the spatial extent of flat-filled regions, and a specific colour is associated with that layer. It should be noted that the size of a foreground layer need only be as large as the content described by that layer. Each foreground layer is compressed independently by MMR (Modified Modified READ (Relative Element Address Designate)), a facsimile coding scheme.

It should be appreciated that the image data in any of the multiple binary foreground layers does not overlap the data in any other of the foreground layers. As a result, each of the foreground layers 1210-1240 can be combined without regard to order or sequence with the background layer 1250. By applying the colour value associated with each of the foreground layers to the background layer according to the binary data of the foreground layer, the resulting image 1260 is obtained.

Figure 1:
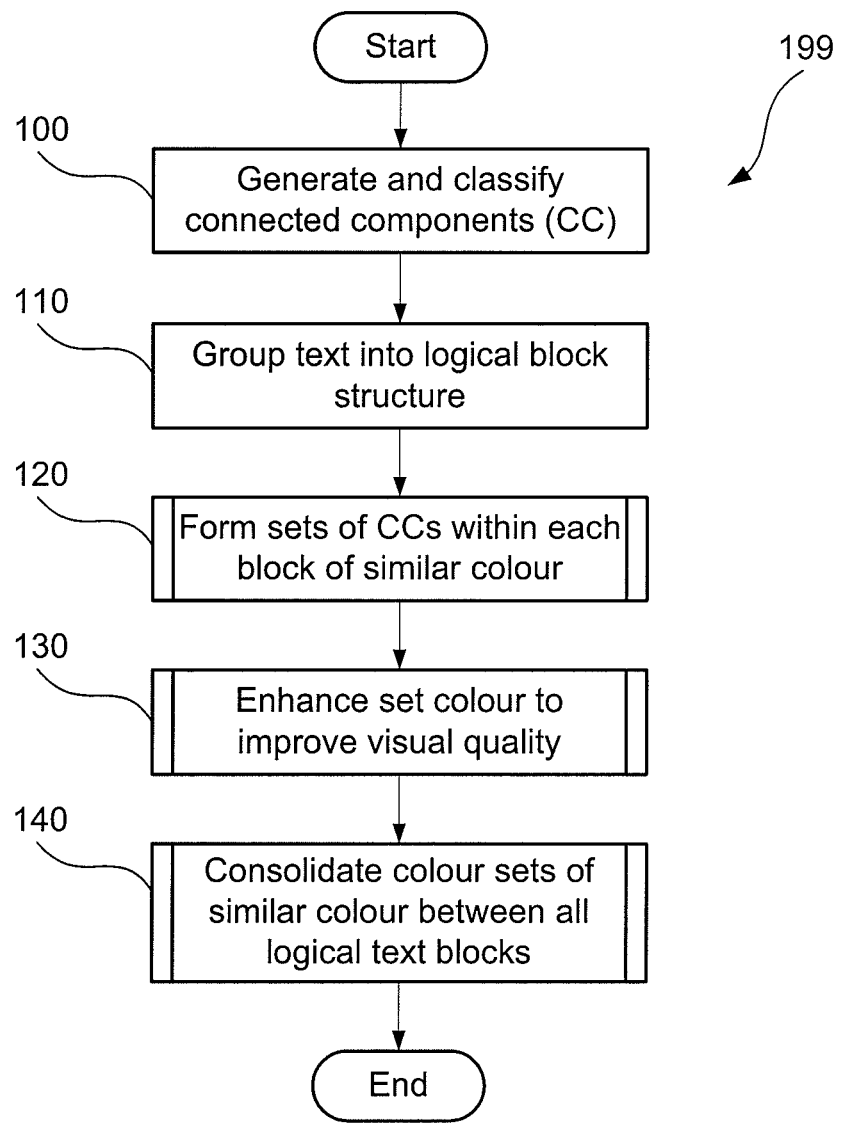
FIG. 1 is processing flow chart of a method of colour modification according to the present disclosure.

FIG. 1 shows a preferred method 199 for modifying the colours of text extracted from a document image. The method 199 is applied to an input such as a scanned document stored in memory as a bitmap image, with the goal of improving visual quality and removing scanning artefacts.

As seen in FIG. 1, the processing of the method 199 includes an initial step 100 which groups touching pixels of similar colour of the scanned bitmap image to form connected components (CCs), thereby effectively dividing the image into groups of connected components. Step 100 further determines whether these connected components represent either text, or some type of non-text page element, such as photographs or graphics. The text elements are then grouped in step 110 into logical page structure blocks. This is desirably performed by grouping connected components into lines and paragraphs. A variety of approaches to perform steps 100 and 110 are known in the art.

For each of the text blocks created by the grouping analysis of step 110, the connected components within a logical text block are grouped into sets in step 120, based on colour similarity and logical colour consistency, wherein all objects assigned to a given colour set are output with the same colour. A colour distance function with a predetermined threshold is used in step 120 to discriminate visually different colours and which, when given two input colours, returns a number describing their similarity. In a preferred implementation, this is calculated as the Manhattan (city-block) distance between the colours in YCbCr colour space, scaled by the difference in hue and saturation.

The logical structure grouping and colour grouping information obtained from the connected components in steps 110 and 120 is then used in step 130 to improve the visual quality of the set of colours, applied individually to each of the previously determined text blocks. This process 130 of enhancing the output colours is expanded in the flow chart shown in FIG. 7, which is described in more detail below. The input to the colour enhancement process 130 is a group of text classified connected components and the associated colour grouping information.

After all text blocks have had their final output colours determined by the colour enhancement process of step 130, additional set merging is carried out in step 140 between all colour sets generated for the page, the process for which is expanded as the block diagram shown in FIG. 8, and described in further detail below. Step 140 consolidates colour sets of similar colour to ensure consistency between text blocks on the page, and may be configured to also be sensitive to realising effective compression in the output format, for example MMR, which is explained in further detail with reference to FIG. 12 below.

Figure 2:
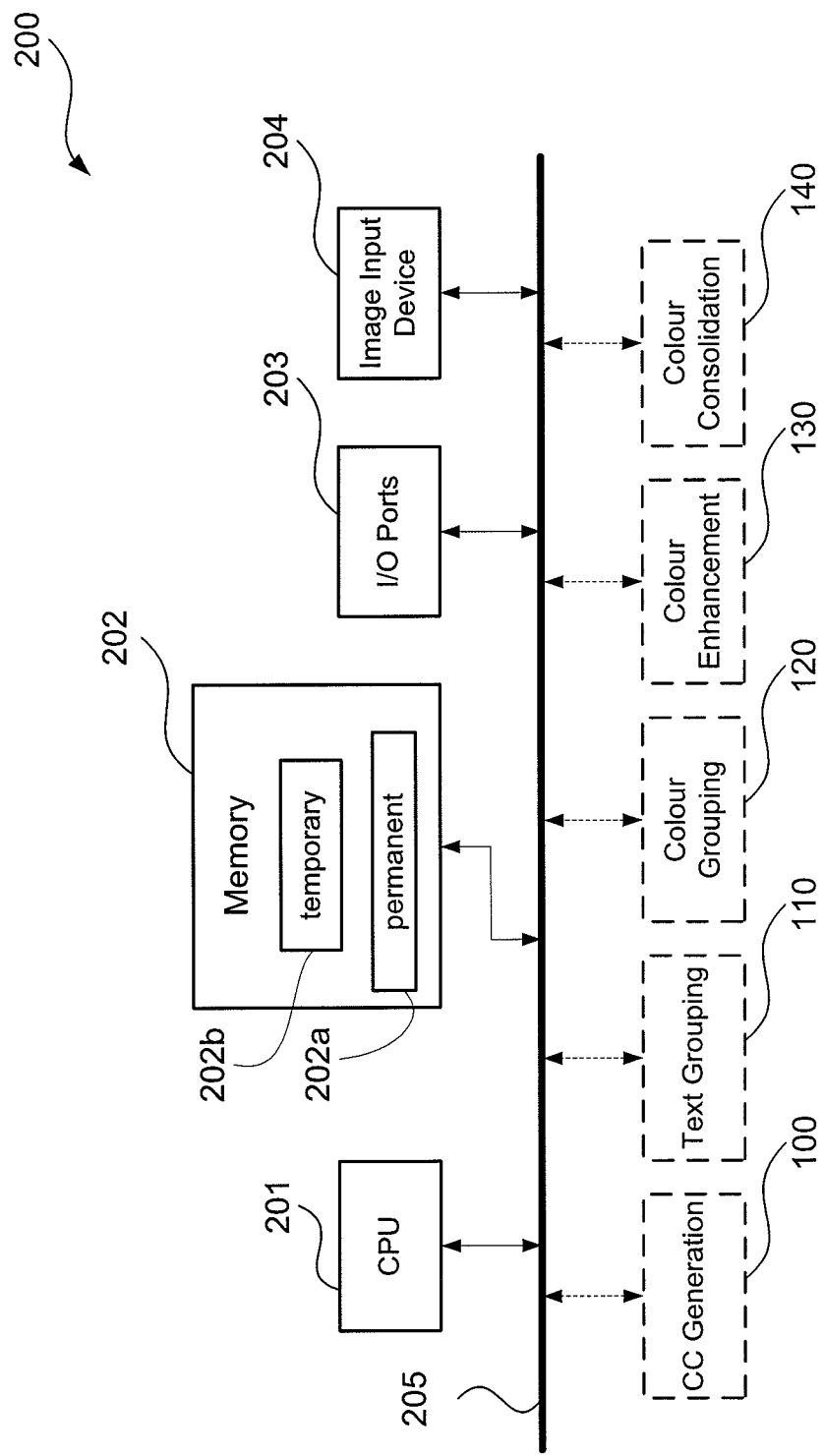
FIG. 2 shows a schematic block diagram representation of an example of an imaging apparatus in which the method of FIG. 1 may be performed.

FIG. 2 shows a block of an image processing apparatus 200 in which the method 199 and the arrangements to be described may be implemented. The apparatus 200 includes a central processing unit 201, or "processor", which controls the overall apparatus 200 and executes the described image manipulation process 199 using programs and data stored in a memory 202. The memory 202 is a computer readable storage medium and has an area 202a for permanent storage of an operating system by which the apparatus 200 is fundamentally controlled and an application program executable by the CPU 201 for implementing the method 199. The memory 202 also has an area 202b for temporarily storing programs and data loaded from external storage devices connected to the various input/output ports 203, storage of image data input from an image input device 204, such as a scanner, digital camera, or the like, and also a work area used by the CPU 201 upon executing the various document analysis modules of the method 199. The aforementioned units may be coupled together via a common bus 205 for internal communication purposes, and any other type of hardware may be used to implement one or more of the components, such as an application specific integrated circuit (ASIC). Also illustrated in FIG. 2 are components corresponding to each of the steps 100-140 of the method 199, and which are typically implemented by respective software code modules forming part of the application program residing in the storage area 202a mentioned above. In some implementations, one or more of the steps 100-140 may be performed by one or more hardware devices coupled as illustrated to the bus 205 for performing the respective function. Such hardware devices may include an ASIC or a field programmable logic array (FPLA). The apparatus 200 may be implemented as part of a general purpose computer device or alternatively as part of a device representing the source of the scanned document image, such as a digital camera, a scanner or a copier.

Connected Component Generation

Figure 9:
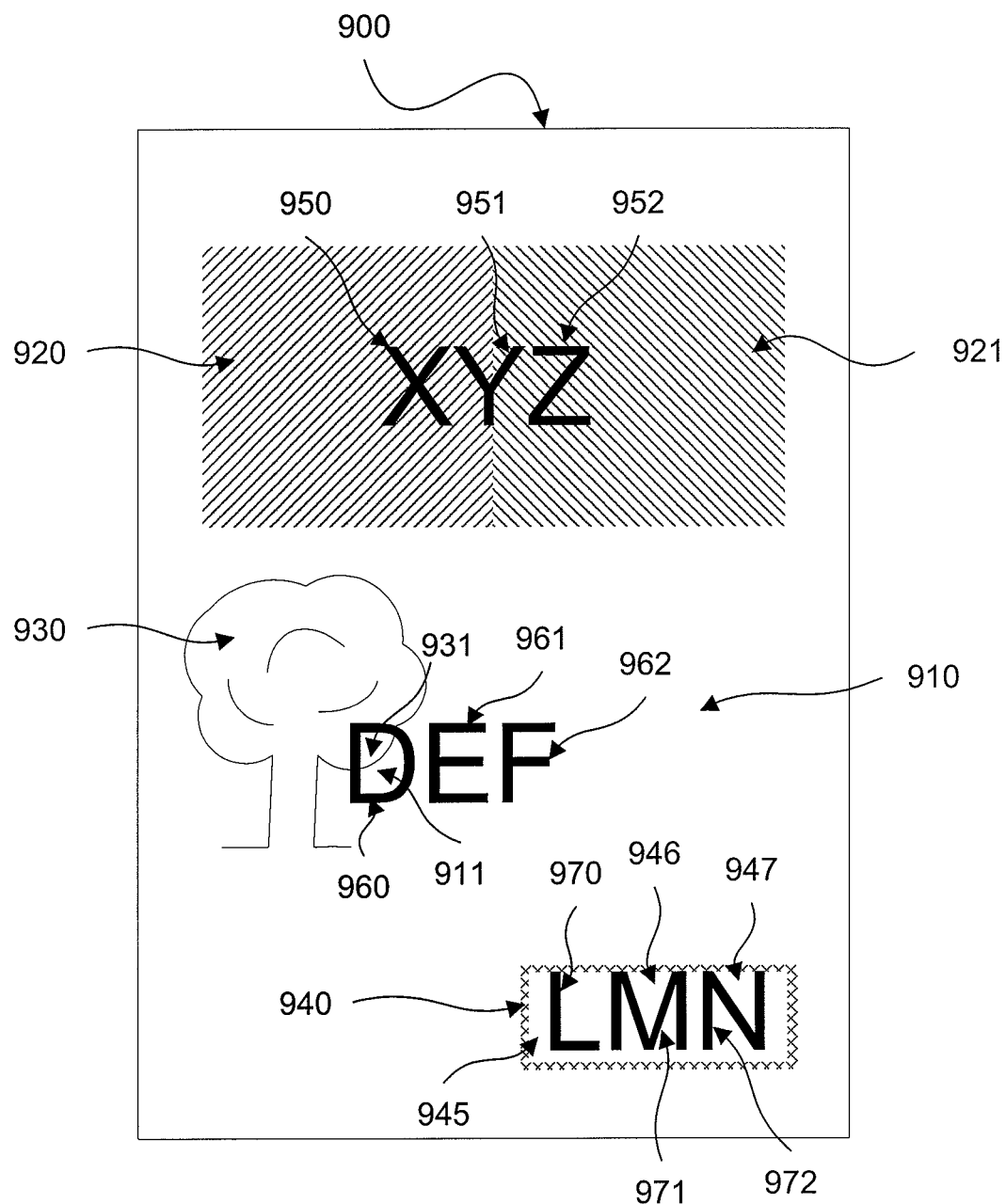
FIG. 9 shows a sample input page for explaining the method of connected component generation and the nature of the connected component enclosure tree.

The image processing system formed by the apparatus 200 and the method 199 generates connected components (CCs) from the scanned input image. The CCs are groups of touching pixels of a similar colour used to represent semantic objects on the page. There exist many methods of generating connected components from an input image and constructing an enclosure tree, an example of the expected output of which is shown for the sample input page of FIGS. 9 and 10 respectively.

The sample input page 900 includes a main page background area 910, which contains other objects of interest. Areas 920 and 921 are solid regions placed over the background 910 and are represented by cross-hatching, and have different colours from each other and the main background 910. The text letters X 950, Y 951 and Z 952 are placed on top of these solid areas 920 and 921 and have a different colour to both. The letter Y 951 occludes both solid background areas 920 and 921, while letters X 950 and Z 952 only occlude the left 920 and right 921 areas respectively. A picture or representation of a tree 930 is shown, which may be a halftone or graphic image. Picture segment 931 is the part of the picture which has been cut by the letter D 960, which partially occludes the picture 930 and the main background 910. This occlusion also results in a background segment 911 being cut from the main background 910. Letters E 961 and F 962 are placed only on the main background 910. A frame 940 has a background region 945 and contains the letters L 970, M 971 and N 972, which all touch the frame 940 and have a different colour to the frame 940. The letter M 971 splits the frame background 945 into an extra segment 946 and the letter N splits the frame background into another extra segment 947.

Figure 10:
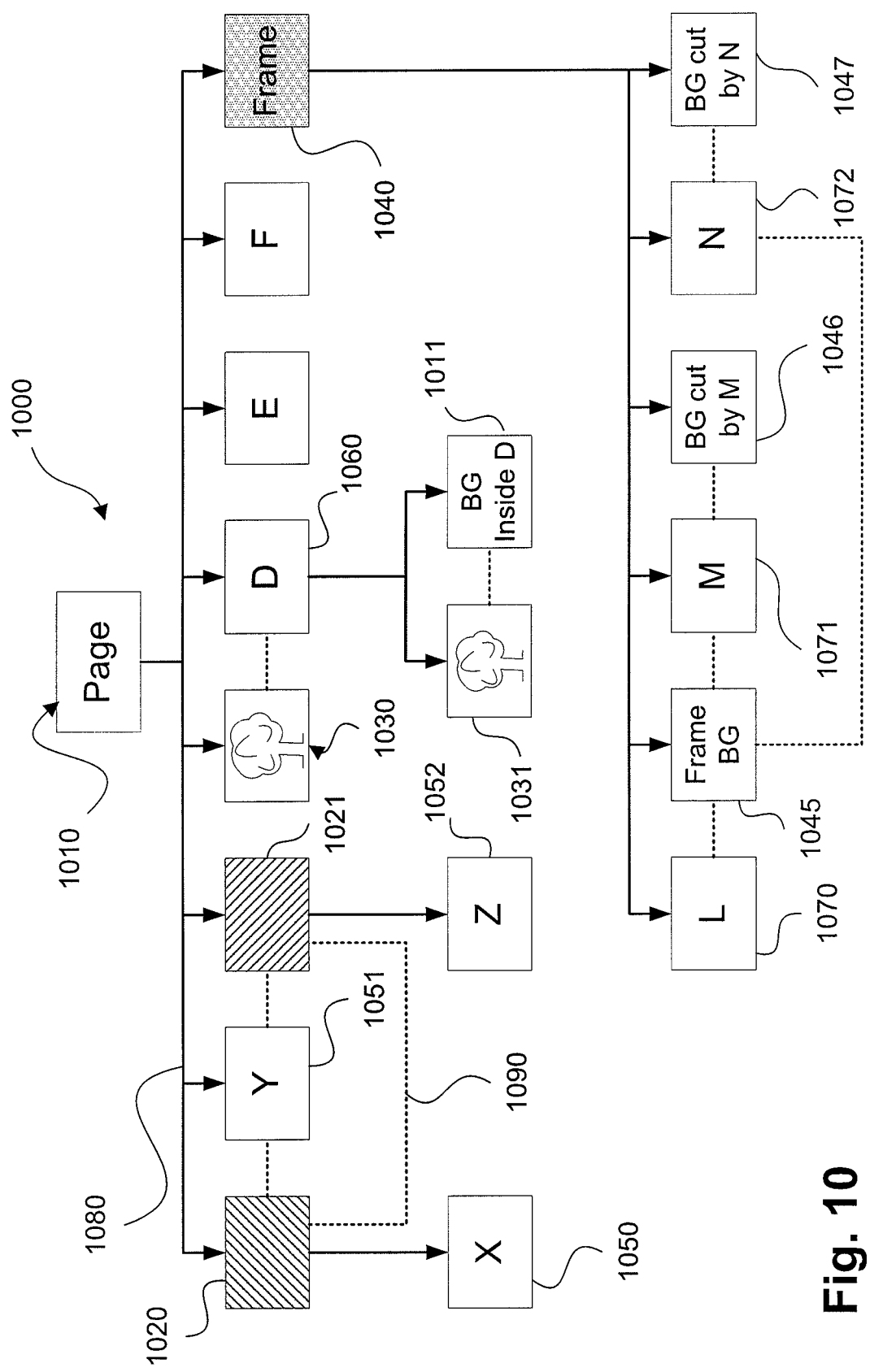
FIG. 10 shows a representative connected component enclosure tree generated by applying the method to the sample input page of FIG. 9.

FIG. 10 shows the enclosure tree 1000 produced by connected component analysis of step 100 applied to the sample input page 900. The root 1010 of the connected component enclosure tree 1000 is a node for the entire page. The nodes of the tree 1000 are related using two kinds of link, being an enclosing relationship link represented by a solid line (such as 1080), and a touching relationship link represented by a dotted line (such as 1090). An object on the page is enclosed by a second object when there is a closed path of pixels from the second object that surrounds the first object. For example, in the sample input page of FIG. 9, the letter X 950 is enclosed by the solid region 920, but letter Y 951 is not enclosed by either of the solid regions 920 or 921, as there is no surrounding closed pixel path from either of these background regions, and instead is enclosed by the main page background 910.

The enclosure tree 1000 represented in FIG. 10 contains the nodes 1020 and 1021, which are children of the main page background (root) node 1010 and which represent the solid regions 920 and 921 respectively. Further, the picture of the tree 930 produces a node 1030 which is a child of the main page node, as does the frame object 940 which similarly produces a frame node 1040. The frame background segment (945) produces an enclosed child node 1045 of the frame. Letters X 950, Y 951, Z 952, D 960, L 970, M 971, and N 972 produce nodes 1050, 1051, 1052, 1060, 1070, 1071 and 1072 respectively. The segments cut by occlusion by other objects include picture segment 931, page background segment 911 and frame background segments 946 and 947, which produce nodes 1031, 1011, 1046 and 1047 respectively. All the aforementioned nodes are enclosed by their appropriate parent nodes. As well as enclosing information, some nodes include touching information which corresponds to the touching relationships of the objects on the sample input page. Touching link 1090 between nodes 1020 and 1021 corresponds to the touching of the solid background regions 920 and 921 respectively. Connected components with the same parent node are siblings in the enclosure tree, and a connected component may touch its siblings and/or its enclosing parent. Note for example that node 1051, which touches two siblings 1020 and 1021, does not touch its parent 1010.

In addition to the connected component enclosure and touching information generated, the connected component construction phase of step 100 includes a statistics module which characterises each of the generated CCs. As an example, the statistics module generates a measure of the edge ratio for each connected component, which is the ratio of the number of perimeter pixels of a CC to the number of constituent pixels forming the CC. Regions that are more solid have relatively fewer edge pixels and correspondingly a lower edge ratio, and thus are less susceptible to colour bleeding pollution than thin connected components, which have a higher edge ratio. Such information is used by the later processing stages to determine an appropriate set of enhancement parameters to apply to a colour set. The following statistics are calculated for each connected component:

Bounding box: The minimum bounding rectangle completely circumscribing the connected component.

Self pixel count: The number of pixels constituting the connected component.

Edge ratio: The ratio of the number of perimeter pixels of the connected component to the self pixel count.

Based on the statistics, text may be extracted from the document image in that individual CCs may be classified as text (for example those with a high edge ratio) or non-text (those with a low edge ratio). Where a number of text-classified CCs are proximate, such may be grouped together to form a text block. A text block may represent, for example, a paragraph of text or a document heading.

Colour Set Creation

Figure 3:
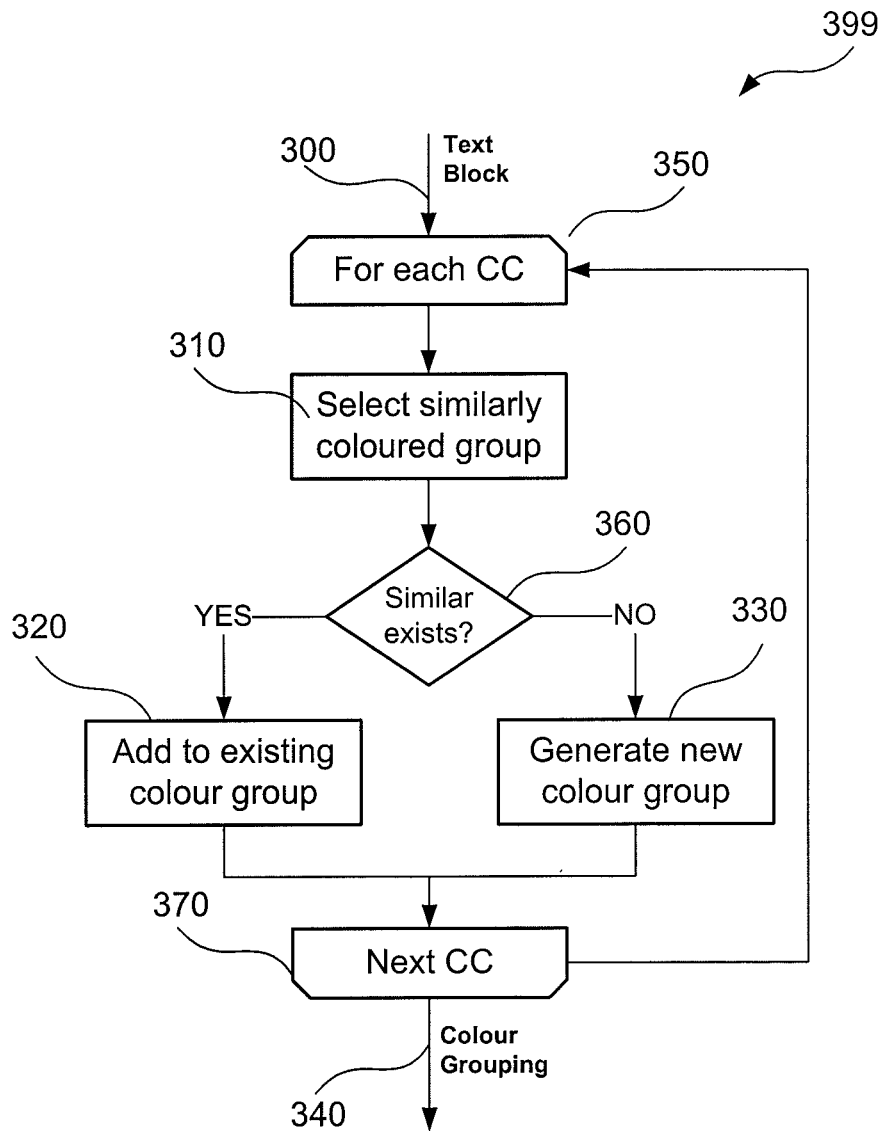
FIG. 3 is a flowchart of a prior art colour grouping method.

Once text blocks are created, the CCs that constitute text blocks are grouped together by colour similarity. Each colour is represented by a bit mask with a specific colour to form part of a foreground image. Each bit mask can then be compressed losslessly by MMR. The composite image, with text represented by flat filled objects in the foreground, typically looks shaper than its corresponding JPEG compressed scan image. However colour inconsistency in the foreground text often occurs due to the aforementioned artefacts, such as noise and colour bleeding. A prior art method for generating colour groups as shown in FIG. 3 is used to demonstrate the colour inconsistency problem. Input to the process 399 is a text block 300, consisting of a number of connected components, each of which have an initial colour derived from the input document. The initial colour may be for example determined as the average colour value of the pixels constituting the connected component in the original scan document, or from a quantised colour image of the input document.

The method 399 operates in a loop to process each of the connected components of the text block. The method 399 first determines in step 310 if the initial colour of the current CC is similar to any existing colour group of the text block. The aforementioned colour distance function with an appropriate threshold or a similar approach may be utilised for this discrimination, and the colour group with the most similar colour is located. If the most similar colour group is close enough in colour, as tested in step 360, the connected component is added to the existing group 320. All CCs assigned to a colour group will have the same output colour. If no similar colour group exists, by virtue of the test of step 360, then a new colour group is created in step 330 for the connected component and attached to the text block.

Once all connected components have been assigned to a colour group, the colour grouping information 340 is then output together with the input text block 300. The threshold used in step 360 for colour similarity checking aims to maintain colour consistencies between the input and output documents, while ensuring the colours of a text block remain logically consistent. However such thresholding is indeed impossible to achieve in some special cases.

Turning our attention for a moment to FIG. 11A, problems associated with the prior art method of colour grouping will be discussed with reference to the sample input page 1100 shown. The input in this example consists of two background regions, being the page 1110 itself and a differently coloured solid-filled region 1120 represented by cross-hatching, which for this example are considered coloured as white and blue respectively. The logical structure analysis in this case identified a text paragraph block 1130, designated by a bounding box shown as a dotted line, and consisting of two lines 1131 and 1132 of text, delineated with a horizontal strike-thru. A second text block 1140 is also identified consisting of a single line 1141 and is represented in a similar fashion.

In this example the original text colour of the paragraph 1130 was set to pure black, however due to printing and scanning reproduction errors such as colour bleeding, when the average colour of all the pixels constituting a CC is calculated, a result that is not pure black is returned. The X and Z characters of the top 1131 and bottom 1132 lines respectively have become slightly bluish, while the Y characters on the top line 1131 have become more pale. Moreover, the text lines are now represented by two distinct and visibly inconsistent colours.

By relaxing the allowable colour distance condition in step 360, it would of course be possible to ensure that all characters of the paragraph 1130 are assigned the same output colour. This would likely result in an impure black in the present example. However, depending on the amount of colour pollution present in the original input document, the difference in the output colour should remain largely unnoticed by a visual inspection, because colour consistency is retained. Such colour consistency is important because it maintains logically consistent colour groups.

However, allowing the colour distance condition in step 360 to combine visually distinct colours in this manner will invariably introduce other errors. Supposing the second text block 1140 on the sample page 1100 is created such that the original colour of the 'a' characters is a dark red, and the 'b' characters are assigned pure black. Under the proposed modification, it is likely that these two distinct text colours on input will be combined into a single colour on output, creating a visibly noticeable error.

Figure 11A:
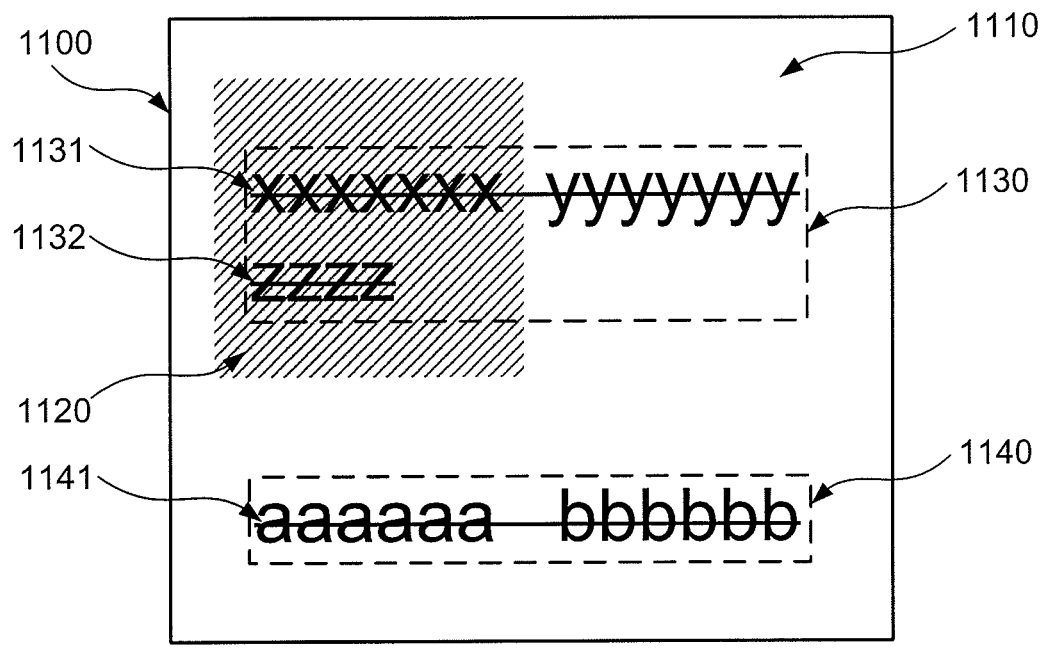
FIGS. 11A and 11B are sample views for explaining the method of colour correction.
Figure 11B:
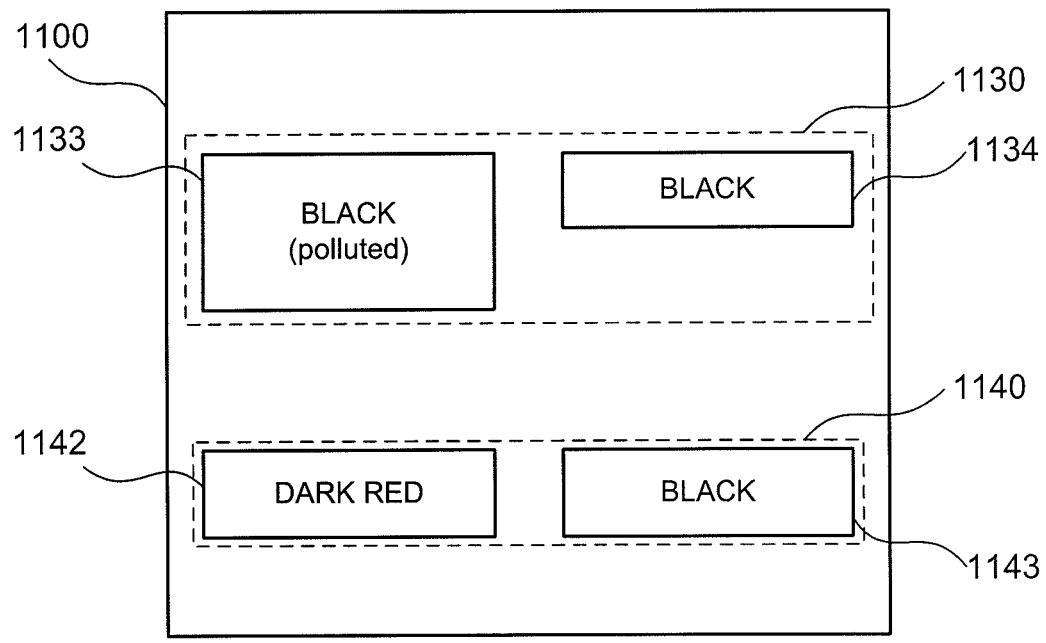

The result of the prior art method 399 for colour grouping is represented in FIG. 11B, where the display has been simplified to highlight the output colour of objects rather than the page content itself. As described above, the lower text block consists of text in two colours; dark red 1142 and black 1143, and the colour distance threshold is, by necessity, set such that these visually distinct colours remain in separate colour groups as shown. As a consequence, the upper text block 1130, which in the original consisted of only black text, has been split into two colour groups of black 1134 text over the main background and the colour-polluted black 1133 of the text lying over the solid-filled region 1120. Such colour splitting results in logically incorrect colour groups which can be very noticeable. Relaxing the colour distance threshold to allow the combination of visually distinct colours would result in both of the text blocks 1130 and 1140 being output in a single colour each.

The purpose of the colour set creation process 120 of the present invention is to ensure that the colours of the connected components constituting a text block are determined with logical consistency, while improving visual quality and removing scanning artefacts, thereby forming logically consistent colour sets.

To reconcile these competing requirements while improving visual quality and correcting source image defects, process 120 analyses the context of the text block with respect to its surrounding region on the page, to define an appropriate set of thresholds for the colour set grouping.

In the preferred implementation, a colour set is a structure storing references to a number of connected components, such as in a list structure, so that all of the connected components are output with the same colour. Additionally, the colour set stores the following information for its contained objects:

(i) Pixel count: The sum of the self pixel counts of each of the connected components.

(ii) Edge ratio: The average edge ratio of the connected components.

(iii) Bounding box: The minimum bounding rectangle of the connected components.

(iv) Foreground colour: The output colour of the connected components.

(v) Background colour: A selected surrounding background colour.

(vi) Area of background colour: The bounding box of the background region within the text block.

(vii) Area of image overlap: The total area of image-classified regions, such as photograph, that overlap the bounding boxes of the connected components of the set. This may be estimated by, for example, the minimum bounding rectangle of the overlapped image-classified regions.

When each connected component is added to a set, the edge ratio and colour information is updated via a pixel-weighted average between the old and new values, and the area of the background colour is accumulated using the bounding box of the connected component. All other information is updated accordingly.

Figure 4:
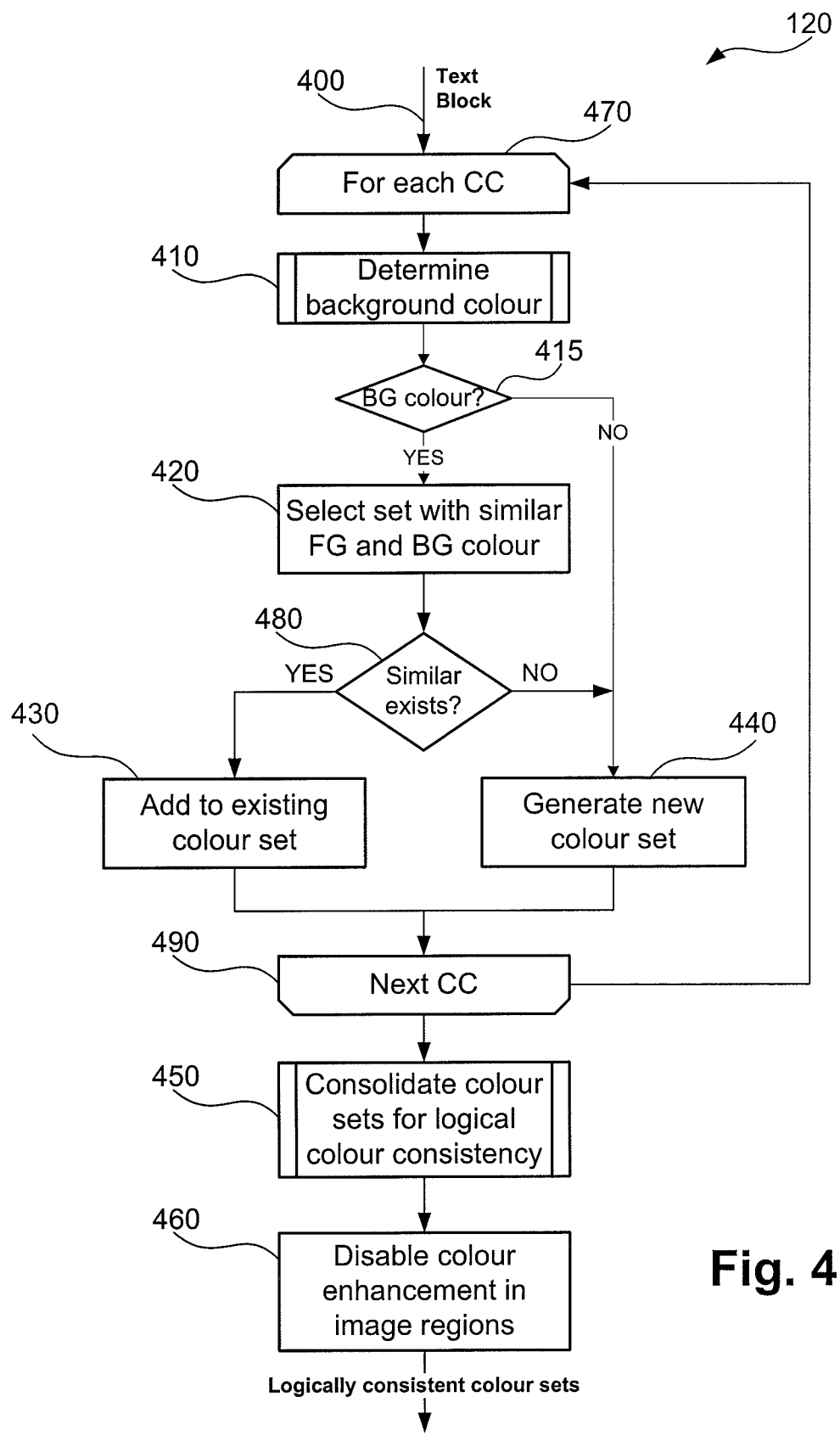
FIG. 4 is a flowchart of the colour set creation process.

FIG. 4 shows a flowchart of the colour set creation process 120 which creates logically consistent colour sets. Input to process 120 is a text block 400 as output from the logical structure grouping of step 110. Again, for each connected component in the text block as managed by steps 470 and 490 which form a loop, the method 120 places the CC in an appropriate colour set based in its foreground and background colours, as well as the characteristics of any nearby non-text regions.

For each of the connected components of the input text block 400 the method 120 first determines in step 410 the appropriate background colour of the connected component. The background colour determination method 410 is explained further below with reference to FIG. 5.

In some cases the background colour analysis cannot sensibly determine an appropriate background colour from the connected component enclosure tree. This can occur for example if the connected component is in the spatial vicinity of an image or photographic region, as the colour of the image object may vary too greatly. Under these circumstances as indicated in step 415, one implementation may simply generate a new colour set at step 440 for the connected component, and may also mark the set as being exempt from the later colour enhancement step 130, to be described. In an alternative implementation, the background colour determination step 410 may revert to pixel-analysis to determine a suitable background colour for the connected component.

The processing flow then proceeds to step 420 to determine if an appropriate colour set already exists for this text block, based on the colour similarity between the foreground and background colours. The aforementioned colour distance function with an appropriate threshold or similar may be utilised for this discrimination, and return the colour set with the most similar colours. If a similar colour group exists, as tested in step 480, the connected component is added to the existing set in step 430, otherwise a new set is generated in step 440 for the connected component and attached to the text block currently being processed.

Once all connected components have been associated with an appropriate colour set, on conclusion of the loop formed by steps 470 and 490, if the text block consists of multiple colour sets, the processing attempts to consolidate the colour sets in step 450 to increase logical foreground colour consistency and account for colour reproduction errors. Unlike the initial colour set selection of step 420, step 450 may merge colour sets with different background colours, wherein the foreground colour similarity requirement for set merging may be determined by the inferred colour reproduction error introduced by the relative difference in background colours.

In reference to the previous example page of FIG. 11A demonstrating the problems with the prior art colour grouping method, prior to the logical colour grouping step 450, the text consists of four distinct colour sets 1133, 1134, 1142 and 1143. After the logical colour grouping process 450, the polluted black coloured text 1133 has been reconciled and the text paragraph 1130 is output in a single colour, while the text block 1140 still correctly retains its two-coloured dark red 1142 and black 1143 text.

As a final step 460, the processing tests if a colour set significantly overlap non-text regions of the page, and if so, marks that colour set as being exempt from the colour enhancement step 130 to follow. Significant overlap may be assessed by a large portion of text classified CCs closely spatially located to non-text classified CCs such as photographs or graphics.

It will be appreciated that if an automated system for connected component classification is used in step 100, it is inevitable that some connected components which do not represent real text on the page are misclassified as such. The ability to disable the colour enhancement process 130 for a connected component or colour set can then reduce the loss of visual quality due to false classifications.

Background Colour Determination

Figure 5:
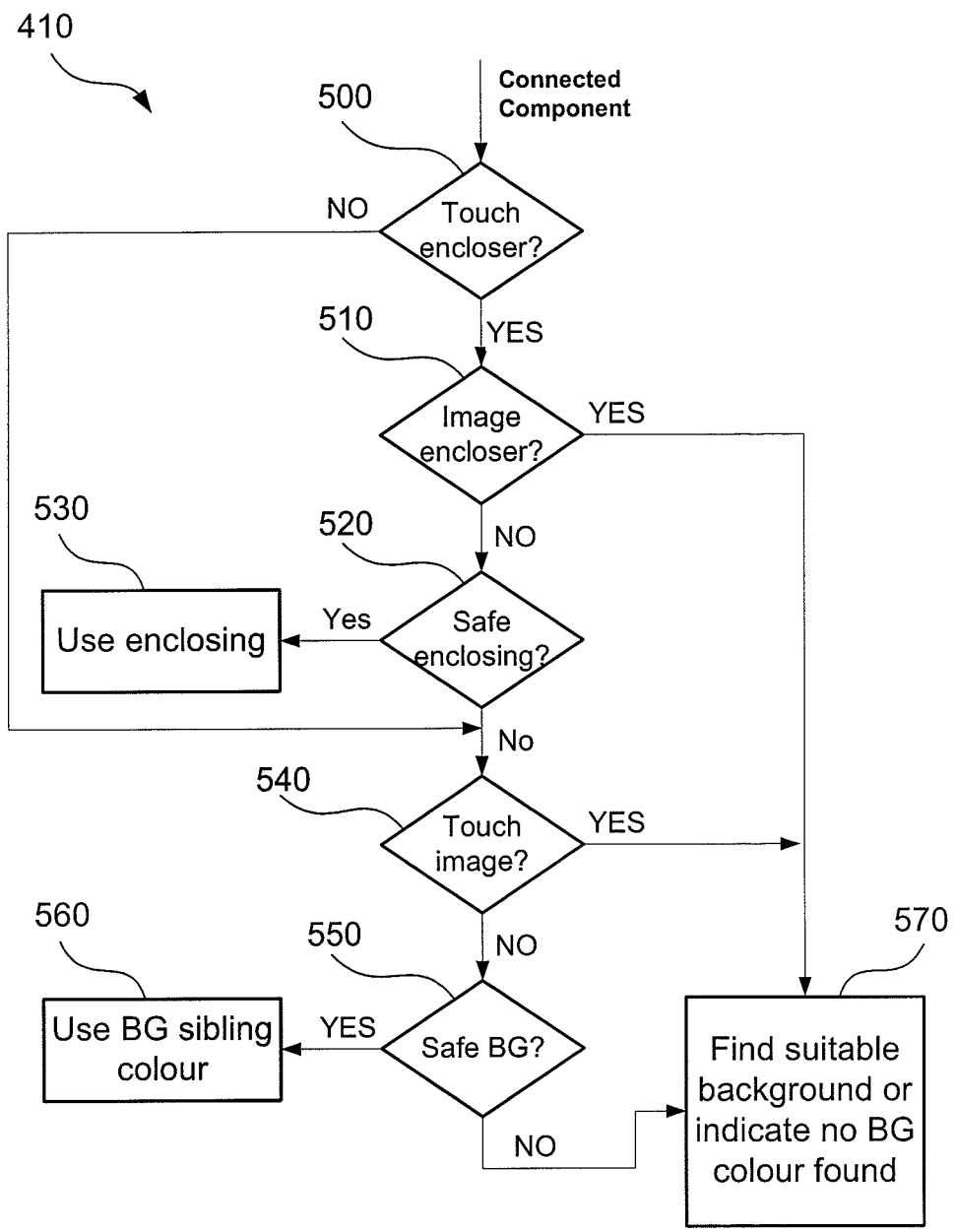
FIG. 5 is flowchart detailing the background colour selection process.

The colour set creation process 120 includes a step 410 to determine the surrounding background colour of a connected component. FIG. 5 shows a preferred method 410 for determining the background colour for a given connected component, the first step 500 tests whether the connected component touches its enclosing (parent) connected component. For example, the letter Y 951 in FIG. 9 previously discussed is enclosed by the main page background 910, but does not touch it. If the connected component does not touch its enclosing CC the process 410 flows directly to step 540, otherwise the parent is tested at step 510 to see whether it is an image object such as photograph or graphic. Where this test shows the parent is an image, no suitable background colour can be determined as at step 570 from the connected component enclosure tree, as the colour of an image object may vary too greatly to use safely. Otherwise, the test of step 510 is followed by a test 520 to determine whether the connected component is safe to use the colour of the enclosing CC as the background colour. The colour of the enclosing CC is safe when the CC has no touched siblings, such as letters X 950, Z 952, E 961 and F 962, or all the touched non-text siblings are relatively small compared to the current CC. If the test 520 determines "Yes", step 530 uses the enclosing connected component as the background colour.

If the CC does not have safe enclosing, then the process 410 checks at step 540 whether the connected component touches any image objects such as photographs or graphics, in which case the background colour can not be reliably determined. If the connected component does not touch any image objects (No from step 540), the processing determines whether any of the touched siblings are background regions in step 550. If the connected component does not touch any background regions, the processing advances to step 570. Otherwise, the process must determine if it can safely use the colour of the touched background siblings. In a preferred implementation, the touched background connected components are examined to determine whether they all come from the same original colour, in which case that colour is selected as the appropriate background colour, according to step 560. This is the case for the letter M 971, which has two background touching siblings 945 and 946, which both derive from the same background colour. In an alternative implementation, the processing of step 410 could be enhanced to support multiple possible background colours, for example by determining which of the possible background colours is the most appropriate.

In the cases where the background colour cannot be determined from the enclosing CC or touched BG sibling, step 570 can be configured to perform pixel-analysis to determine an appropriate background colour or alternatively simply indicate no suitable background colour has been found. The pixel-analysis method may for example determine the background colour through interpolation with the surrounding region, or alternatively, search around the border of the connected component and use the average of the colour that is found.

While the description of FIG. 5 uses the term background to mean a solid background such as the main page background 910 or frame background 945 of the sample input page, an alternative implementation could also consider the flat part of an image area or the like wherein there is a low colour variation between the pixels of the region.

Consolidate Colour Sets for Logical Colour Consistency

Figure 6:
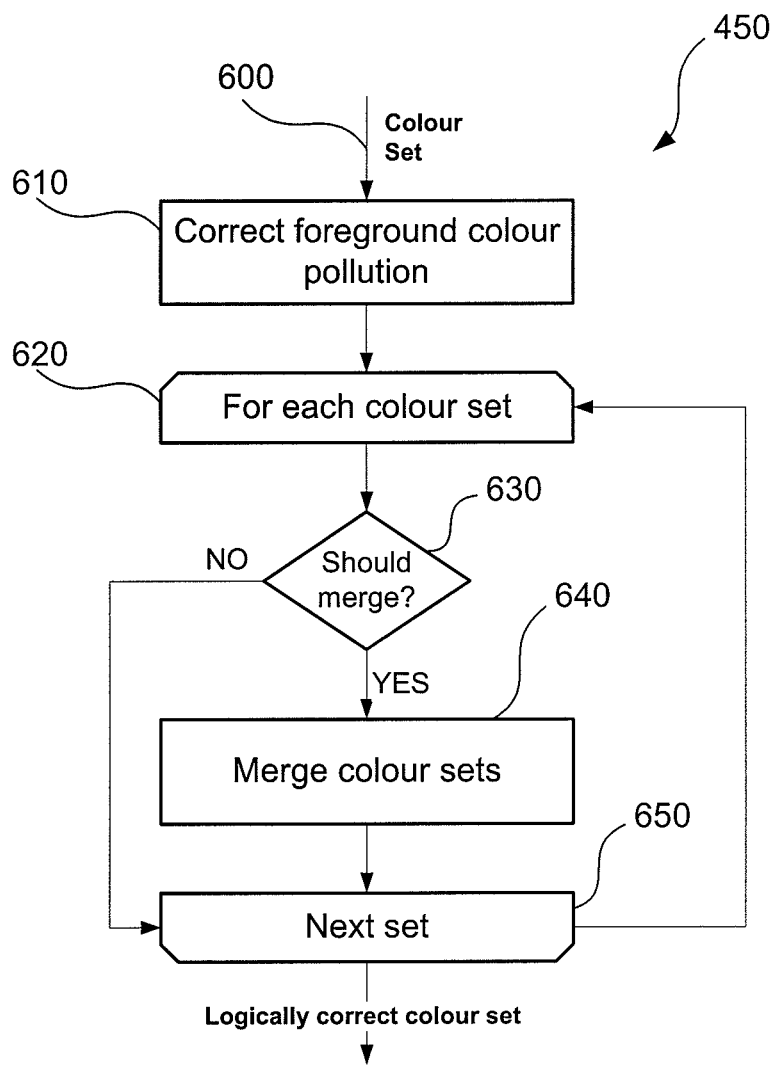
FIG. 6 is a flowchart of the creating logically consistent colour groups process.

The final stages of the colour set creation process 120 include step 450 to further consolidate the colour sets of a text block, which is expanded as the flow chart of FIG. 6 as applied individually to each colour set 600 of a given text block.

For each colour set of the input text block, the process 450 may optionally first estimate in step 610 if the foreground colour has been subjected to colour pollution from the background. In a preferred implementation, this process is limited to colour sets with a high edge ratio and insignificant contrast between the foreground and background colours, such as for example thin black text over a blue background.

A method for colour correction useful in step 610 could for example adjust the RGB colour components of the foreground colour by a fraction of the background colour components, relative to the maximum component of the background colour. That is, for each colour component $i \in \{r, g, b\}$, a proportion of the corresponding background colour component (Z) is removed, scaled by a correction factor $c_i=kZ_i/\max(Z)$, for some factor of colour pollution k. For foreground colours close to black, the method would subtract the value of the inferred background colour pollution from each of the corresponding colour components, whereas for foreground colours close to white, the reduction method would be additive. The value of the parameter k could for example be a constant, such as 0.1, or it could also be a function of the edge ratio of the colour set. This has the effect of compensating each of the foreground colour of the colour sets based on its background colour.

The processing then, in a loop 620 for each colour set, compares in step 630 the input (reference) colour set to at least one and preferably each of the other (neighbour) colour sets of the text block to determine if the colour sets should be merged. As a consequence of the comparison, the colour sets are merged if either (a) the background and foreground colours are similar to within a first predetermined threshold of colour distance (as in step 420); or (b) the background colours are different, and the foreground colours are similar to within a second, relaxed, colour distance threshold. In one example method of the second instance, the foreground colour distance threshold may be predetermined, for example a value of 50 is compared to a value of 25 in the initial creation stage of step 420. In an alternative method, the foreground colour distance threshold may be a function of the dissimilarity between the two background colours.

If the processing determines that the reference and neighbour colour sets should be merged, this takes place in step 640 and the information associated with the colour set is updated in the same manner as when a connected component is added to a colour set. This has the effect of setting the colour for the first and second text connected components according to the determined output colour. An exception to this process is the choice of background colour, which selects a single representative background colour from the pair in preference of (a) the non-white background if one background colour of the pair is non-white; or (b) the background colour covering the largest area within the text, if both background colours are non-white. An extension of this process may also consider the number of connected components of which each colour of the pair forms a background.

After the reference colour set has been compared to all other colour sets of the text block, the processing begins anew with the next colour set of the text block as the reference colour. Once all colour sets of the text block have been processed, the method 450 ends, as does step 120, outputting a logically consistent colour set representing all text of visually similar colour of the corresponding text line or paragraph from the document image.

Colour Enhancement

Referring once again to FIG. 1, once the connected components of a text block have been assigned to a colour set in step 120, which then represents the output colour of all CCs within that colour set, the processing flow then moves onto the colour enhancement module 130. The module 130 attempts to improve the visual quality of the page by making visually black colours darker, visually white colours lighter, and colours brighter and more saturated.

If an automated connected component classification system is utilised in step 100, applying a significant amount of colour enhancement will produce a visually noticeable inconsistency if, for example, the classifier fails to correctly identify all text characters in a word. Similarly, over-saturating colours may also lead to noticeable inconsistencies with the source image. The preferred implementation allows the colour enhancement function to be disabled for a colour set if the decision in step 460 decides that the colour set is not suitable for colour enhancement.

Figure 7:
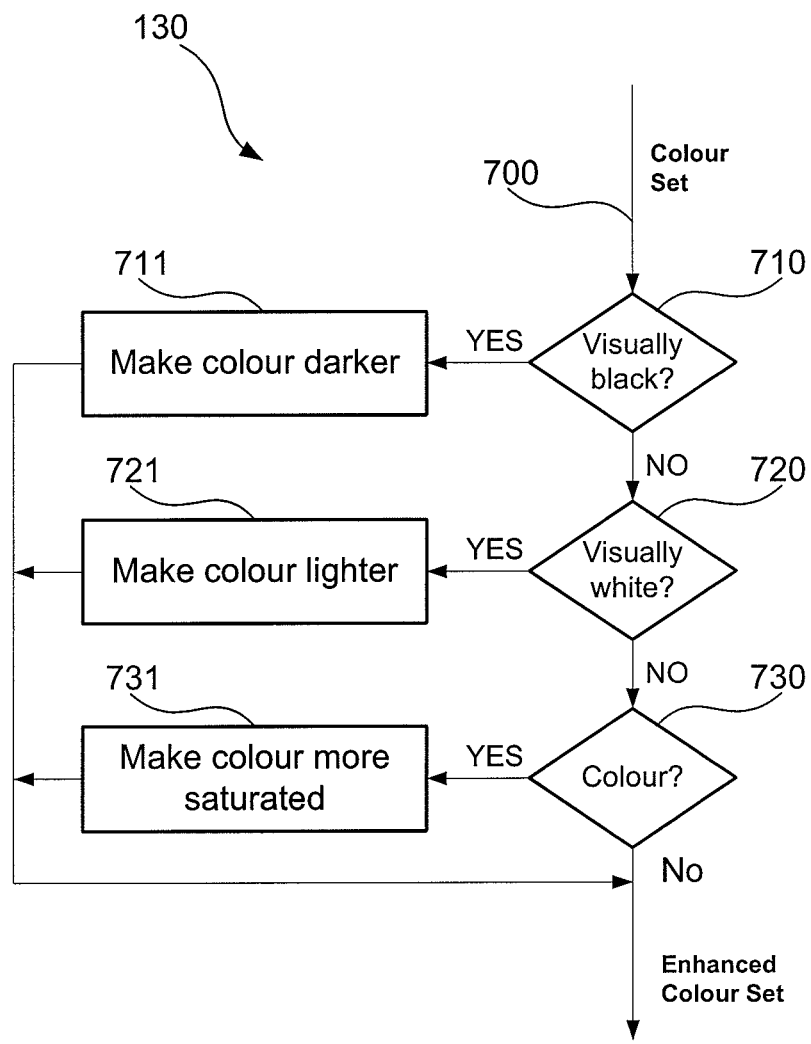
FIG. 7 is a flowchart of the colour enhancement process.

The processing flow of the colour enhancement module 130 is expanded as the block diagram of FIG. 7, applied individually to each colour set for each text block. The module includes a function 710 which first determines if the input colour set 700 is visually black. In one example method this is determined by checking if either of the following criteria is fulfilled:

(i) The value of the YCbCr colour space luminance channel, or the sum of the luminance and colour saturation, is below an appropriate threshold (20 and 120 respectively, in an 8-bit range of 0-255) (i.e. very close to black); or (ii) The HSV colour space value channel of the foreground colour is much lower than the value channel of the background colour, and the hue channel component is similar for both the foreground and background.

For colour sets that are determined to represent visually black colours, the process 130 modifies the colour set to make the colour darker (i.e. blacker) in step 711. An example method of making colours darker could decrease both the saturation and value of the HSV colour data according to the following relation, where the new colour component value $x_n$ is calculated by multiplying the old value $x_o$ by an adjustment parameter k:

$$x_n = kx_o \qquad (1)$$

The value of k is calculated according to the edge ratio e of the colour set, and in one example follows a stepwise function:

$$k = \begin{cases} 0.8, & e > 0.5 \\ 0.9, & 0.1 < e \le 0.5 \\ 1.0, & e \le 0.1 \end{cases} \qquad (2)$$

An extension to the example can vary the value of k as a linear function between the upper and lower bounds, instead of choosing the median value.

Otherwise the module determines in step 720 if a colour of the set is visually white, which in one example method is true if either of the following conditions is fulfilled:

(i) The value of the YCbCr colour space luminance channel is high (greater than 230) and the saturation is low (below 25); or (ii) The HSV colour space value channel of the foreground colour is much higher than the value channel of the background colour, and the hue channel component is similar for both the foreground and background.

If the colour set is determined to represent visually white colours, the process 130 modifies the colour set to make the colour lighter (i.e. whiter) in step 721. An example method for making colours lighter decreases the HSV saturation component and increases the value component of the colour data according to Equation 1 above. The value of the adjustment parameter k is calculated according to the edge ratio e of the colour set. In one example method the saturation is decreased according to Equation 2 above, and the value component is increased according to the stepwise function:

$$k = \begin{cases} 1.2, & e > 0.5 \\ 1.1, & 0.1 < e \le 0.5 \\ 1.0, & e \le 0.1 \end{cases} \quad (3)$$

As above, an extension to the example can vary the value of k as a linear function between the upper and lower bounds, instead of choosing the median value.

Finally, for any colour sets that represent non-greyish colours as assessed in step 730, the process modifies the colour set to make the colour more saturated in step 731 to increase the subjective visual quality of the page. If step 730 determines the colour set is a greyish colour, no colour enhancement is applied and the method 130 ends. If step 730 determines the set is not a colour, the step 130 ends. In one example method, the process selects all colours that are not visually-grey, as it has been already determined that the colour also does not represent black or white. An example method of determining whether a colour is visually-grey is if it satisfies the following condition:

The saturation is low (less than 50) and the sum of the saturation and the YCbCr luminance component are not high (less than 185).

For colours that are not visually grey, the example method increases the HSV saturation component according to Equation 1 above, where the enhancement parameter k is given by Equation 3.

Following the colour enhancement process 130 all of the text blocks on the page have had their final output colours determined Colour Set Consolidation Referring once again to FIG. 1, following the colour enhancement step 130, additional set merging may be carried out in step 140 between all of the colour sets generated for the page. Step 140 may consolidate all similar foreground colours on the page to ensure colour consistency between text blocks. Alternatively the step 140 may be sensitive to improving the compression in the output format, the process 140 which is expanded as the block diagram of FIG. 8. More specifically, the colour set grouping ensures that the output memory size does not increase when separate regions are combined.

Figure 8:
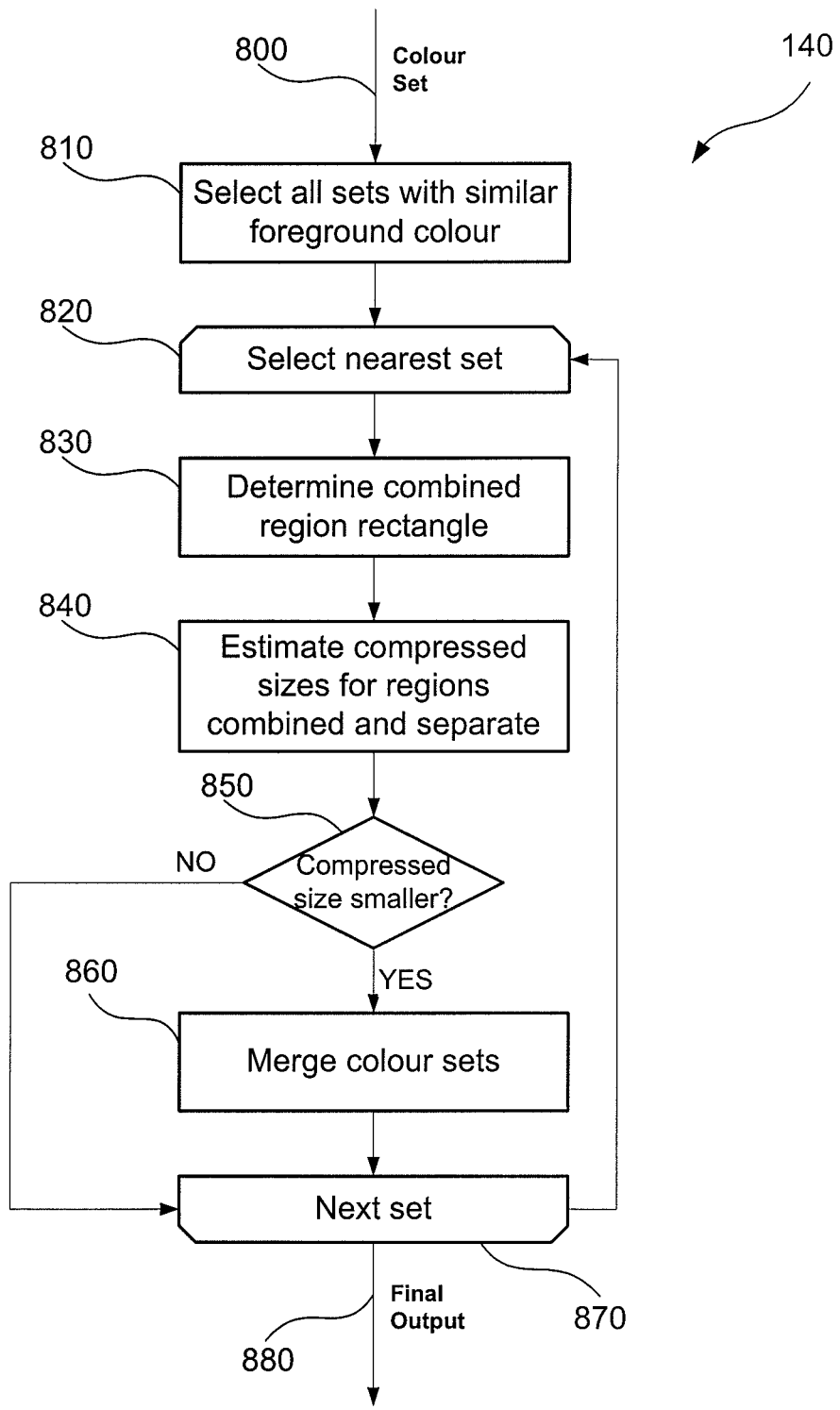
FIG. 8 is a flowchart of the consolidating colour sets process.

The preferred processing of the colour set consolidation 140 proceeds by applying each of the colour sets generated for the page as input 800 to the process shown in FIG. 8, which first selects at step 810 from the page all colour sets with a visually similar foreground colour. The processing then at step 820 examines in a loop each of the selected (neighbour) sets in order of increasing distance from the input (reference) colour set. If no neighbouring colour sets were located, then the processing begins anew for the next reference colour set.

The combined area that includes the neighbour and reference areas is then determined at step 830. The total memory size of the compressed MMR data upon individually compressing the reference and neighbour areas, and the memory size upon compressing the combined area can then be estimated in step 840. When the reference and neighbour areas ($A_R$, $A_N$ respectively) are compressed individually using a compression ratio $k_T$ and header size h, the total memory size can be estimated as:

$$S_I = k_T(A_R + A_N) + 2h \quad (4)$$

On the other hand, when the combined area $A_C$ is compressed, an empty gap area $A_G$ is included between the reference and neighbour areas, which can be encoded with a higher compression ratio $k_G$. The total memory size can be estimated as:

$$S_C = k_T A_C + k_G A_G + h \quad (5)$$

An alternative approach to step 840 would be to actually compress the regions to determine the accurate memory footprint for the reference and neighbour areas compressed separately or combined.

The estimates of the compressed sizes are then compared in step 850, and if it is determined that the compressed data size obtained from combining the reference and neighbour areas is smaller than encoding the areas separately ($S_C < S_I$), then the colour sets are merged or combined in step 860. Following this, the next nearest neighbour set of similar foreground colour is selected at step 870 and processed in the manner above by returning to step 820.

If the compressed data size is smaller when the regions are encoded separately ($S_I < S_C$), then processing continues directly to step 870 for the next nearest neighbour selected. The illustrated implementation may be configured to also assign the reference and neighbour colour sets to the same output colour, such as via the manner used when combining colour sets, to retain colour consistency across the page while ensuring the smallest compressed size is generated.

Figure 13A:
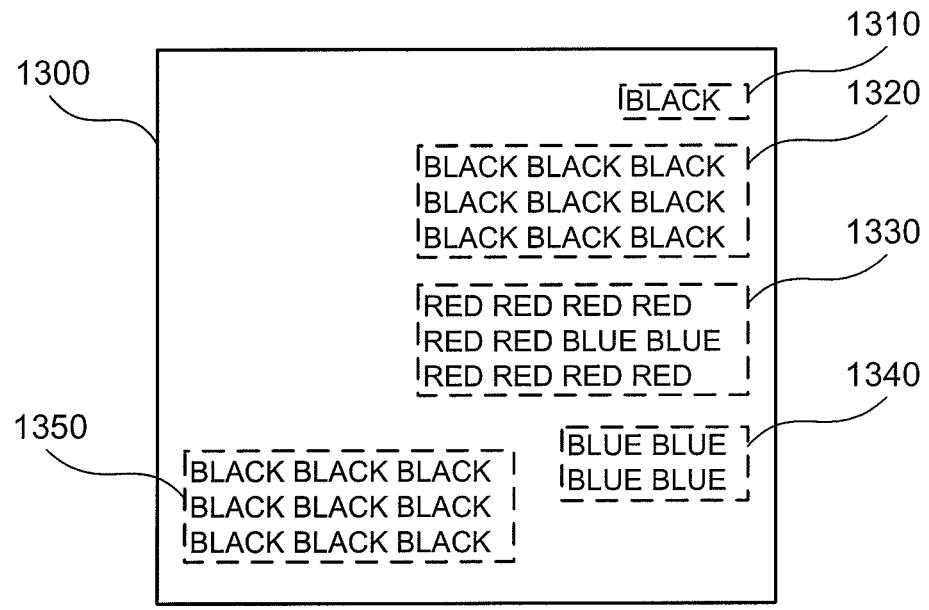
FIGS. 13A and 13B are sample views for explaining the inclusion process according to the method of foreground mask consolidation.
Figure 13B:
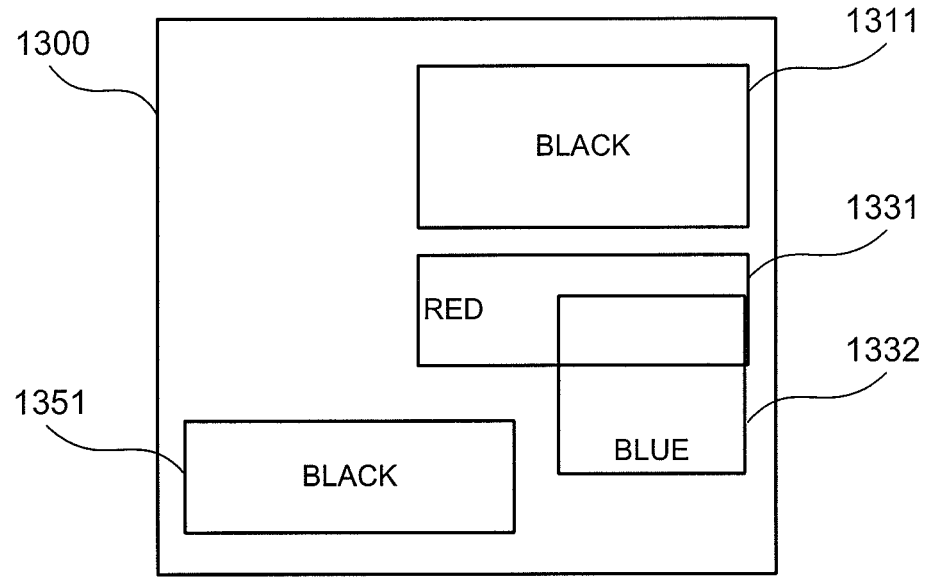

An example of the colour set consolidation process is shown in FIG. 13A, where the input page 1300 contains several text blocks 1310, 1320, 1330, 1340, and 1350, where the colour of the text characters are as shown. The result of the colour set consolidation process 140 is shown in FIG. 13B.

When the text block 1310 is selected as the reference text block in step 800, the process selects at step 810 the colour sets belonging to the text paragraphs 1320 and 1350 as having similar foreground colour. It is determined that the compressed size of the closely spatially located colour sets belonging to the text blocks 1310 and 1320 is smaller than compressing the areas individually, and so the two colour sets are merged, producing the output colour set 1311. However, it is found that combining the colour set associated with the text block 1350 results in an increase to the compressed size, as a large amount of empty space must be encoded between the top and bottom of the page, and so this area is compressed individually, resulting in the output colour set 1351.

Similarly, the blue colour set associated with the text block 1330 is combined with the colour set of text block 1340, resulting in the output colour set 1332. The text block 1330 is then constructed from the two colour sets 1331 (red) and 1332 (blue).

In summary, according to the above arrangements, an image processing apparatus and method are provided for accurately reproducing the information bearing objects of a document image, while enhancing colours to achieve improvements in the subjective visual quality of the input and being sensitive to realising effective compression in the output.

INDUSTRIAL APPLICABILITY

The arrangements described are applicable to the computer and data processing industries and particularly for the storage of images of documents bearing mixed text and image components.

The foregoing describes only some embodiments of the present invention, and modifications and/or changes can be made thereto without departing from the scope and spirit of the invention, the embodiments being illustrative and not restrictive.

We claim:

1. A method of correcting colours of text extracted from a document image, said document image comprising text and image regions of various colours, the method comprising:
   (a) dividing the document image into a plurality of connected components, the connected components comprising pixels of similar colour that are closely spatially located, and selecting from said image a plurality of the connected components that represent text;
   (b) grouping said plurality of text connected components to form a text block representing a text line or paragraph;
   (c) forming colour sets in said text block based on the colours of said text connected components;
   (d) determining a single colour set for said text block based on colour similarity of the formed colour sets in said text block and of corresponding enclosing background colours; and
   (e) correcting the colour of said text block using the determined single colour set.

2. A method according to claim 1, further comprising merging said formed colour sets of the said text block depending on a threshold for a foreground colour distance of said pair, wherein said threshold is determined by a background colour difference of the said pair.

3. A method according to claim 1, wherein
   each of the formed colour sets is compensated based on the corresponding enclosing background colour; and
   said formed colour sets of the said text block are merged depending on a predetermined colour threshold for the difference of the foreground colours of the pair.

4. A method according to claim 1, wherein the enclosing background colour further includes information of any closely spatially located graphic regions, a pixel count, and a minimum bounding rectangle.

5. A method according to claim 1, wherein a background colour is determined, in order, by the steps of:
   (a) selecting the non-white background colour of the enclosing background colour if one of the enclosing background colours is non-white;
   (b) selecting from the enclosing background colours a background colour covering the largest area if both of the enclosing background colours have non-white background colour; and
   (c) updating the associated background colour information with:
      (i) the sum of background pixel counts of the enclosing background colours;
      (ii) the sum of the statistics of any closely spatially located graphic regions of the enclosing background colours; and
      (iii) the minimum bounding rectangle enclosing both of the minimum bounding rectangles of the enclosing background colours.

6. A method according to claim 1, further comprising creating a new colour set if said formed colour sets of the said text block are not similar.

7. A method according to claim 1, wherein an amount of colour correction depends on the edge ratio of the connected components within each of the said colour sets.

8. A method according to claim 1, wherein visually black colours are made blacker, visually white colours are made whiter, and visually non-greyish colours are made more saturated.

9. A method according to claim 8, wherein visually black colour is determined based on one of these criteria:
   (a) the formed colour set in said text block is very close to black; or
   (b) the formed colour set in said text block has a much lower HSV value component than the corresponding enclosing background and the hue channel components are similar.

10. A method according to claim 8, wherein visually white colour is determined based on one of these criteria:
    (a) the formed colour set in said text block is very close to white; or
    (b) the formed colour set in said text block has a much higher HSV value component than the corresponding enclosing background and the hue channel components are similar.

11. A method according to claim 8, wherein visually non-greyish colour is determined by HSV saturation and YCbCr luminance of the formed colour set in said text block if HSV saturation is below a predetermined threshold and the sum of HSV saturation 10 and YCbCr luminance is below a second predetermined threshold.

12. A method according to claim 1, wherein the colour correction is optionally disabled if at least one of said formed colour sets is closely spatially located to a significant graphic region.

13. A method according to claim 1, further comprising merging colour corrected sets across said text blocks with a similar colour.

14. A non-transitory computer readable storage medium having a computer program recorded thereon, the program being executable by computer apparatus to correct colours of text extracted from a document image, said document image comprising text and image regions of various colours, the program comprising:
    code for dividing the document image into a plurality of connected components, the connected components comprising pixels of similar colour that are closely spatially located, and selecting from said image a plurality of the connected components that represent text;
    code for grouping said plurality of text connected components to form a text block representing a text line or paragraph;
    code for forming colour sets in said text block based on the colours of said text connected components;
    code for determining a single colour set for said text block on colour similarity of the formed colour sets in said text block and of corresponding enclosing background colours; and
    code for correcting the colour of said text block using the determined single colour set.

15. A computer apparatus comprising a processor, a memory, an input for a document image and an output for a modified document images, said memory having a computer program recorded therein, the program being executable by the processor to correct colours of text extracted from the document image, said document image comprising text and image regions of various colours, the program comprising:
    code for dividing the document image into a plurality of connected components, the connected components comprising pixels of similar colour that are closely spatially located, and selecting from said image a plurality of the connected components that represent text;
    code for grouping said plurality of text connected components to form a text block representing a text line or paragraph;

code for forming colour sets in said text block based on the colours of said text connected components;

code for determining a single colour set for said text block based on colour similarity of the formed colour sets in said text block and of corresponding enclosing background colours; and code for correcting the colour of said text block using the determined single colour set.

* * * * *